(12) United States Patent
Kim

(10) Patent No.: US 6,860,193 B1
(45) Date of Patent: Mar. 1, 2005

(54) REINFORCING DEVICE FOR HOUSEHOLD BEAN MILK AND BEAN CURD MAKERS

(76) Inventor: Hong-bae Kim, 5-7 Hyunchen-dong, Dukyang-ku, Koyang-city, Kyunggi-do (KR)

( * ) Notice: Subject to any disclaimer, the term of this patent is extended or adjusted under 35 U.S.C. 154(b) by 0 days.

(21) Appl. No.: 10/792,382

(22) Filed: Mar. 4, 2004

(30) Foreign Application Priority Data

Sep. 17, 2003 (KR) ................................. 20-2003-0029496

(51) Int. Cl.7 ............................ A23L 1/00; A23L 1/20; A47J 43/044; B01F 7/20; A23C 3/02
(52) U.S. Cl. ............................. 99/348; 99/281; 99/285; 99/286; 99/288; 99/337; 99/453; 99/456; 99/483; 99/510; 366/204; 366/146; 366/249; 366/251; 366/331
(58) Field of Search ........................... 99/275, 279–281, 99/283, 285, 286, 288, 390, 300, 323.3, 331, 337, 338, 341, 348, 452–455, 456–460, 468, 483, 485, 495, 509–513; 426/43–46, 50, 52, 61, 431, 656, 520, 598, 523; 210/346, 694, 511, 514, 780, 793; 366/279, 204, 144–146, 249–251, 96–98, 100–104, 314, 331

(56) References Cited

U.S. PATENT DOCUMENTS

| | | | |
|---|---|---|---|
| 2,980,099 A * | 4/1961 | Klemm ........................ 126/20 |
| 4,059,016 A | 11/1977 | Kitzinger et al. |
| 4,203,099 A | 5/1980 | Edwards |
| 4,205,237 A | 5/1980 | Miller |
| 5,013,158 A * | 5/1991 | Tarlow ........................ 366/251 |
| 5,201,263 A * | 4/1993 | Teng ............................ 99/335 |
| 5,446,444 A | 8/1995 | Lease |
| 5,487,359 A | 1/1996 | Montreuil |
| 5,516,208 A * | 5/1996 | Givant ........................ 366/251 |
| 5,600,997 A | 2/1997 | Kemp et al. |
| 5,699,239 A | 12/1997 | Komori |
| 5,852,965 A | 12/1998 | Kim |
| 5,936,356 A | 8/1999 | Brault |
| 6,232,883 B1 | 5/2001 | Silva et al. |
| 6,247,393 B1 | 6/2001 | Chang |
| 6,248,978 B1 | 6/2001 | Okuda |
| 6,345,572 B1 | 2/2002 | Kao |
| 6,653,941 B2 | 11/2003 | Kim |
| 6,688,214 B1 * | 2/2004 | Kikuchi et al. ............... 99/483 |
| 6,703,723 B2 * | 3/2004 | Kim ........................... 307/112 |

* cited by examiner

Primary Examiner—Timothy F. Simone
(74) Attorney, Agent, or Firm—Shlesinger, Arkwright & Garvey LLP

(57) ABSTRACT

Reinforcing device for household bean milk and bean curd makers reinforces a structure for fastening a drive motor to a main body using a bracket, thus reducing vibration and noise. The reinforcing device is constructed such that a body cap extends to a predetermined length, thus preventing a lower portion of the main body from being thermally deformed, and for reducing vibration and noise. The reinforcing device may include a first bracket provided at a predetermined position between the body cap and the main body to increase a force to fasten the drive motor to the main body, and the reinforcing device may include a locking element for assembling the body cap, the first bracket, and the drive motor with the main body into a single or unitary body.

8 Claims, 5 Drawing Sheets

REINFORCING DEVICE FOR HOUSEHOLD BEAN MILK AND BEAN CURD MAKERS

CROSS-REFERENCE TO RELATED APPLICATIONS

This application claims the priority of Korean patent application no. 2003-0029496, filed Sep. 17, 2003, which is incorporated herein by reference.

This application likewise relates to the following three (3) U.S. patent applications in the name of Hong-bae KIM:

1. application Ser. No. 10/131,460, filed Apr. 25, 2002, now U.S. Pat. No. 6,653,941 to Kim, issued Nov. 25, 2003.
2. application Ser. No. 10/131,192, filed Apr. 25, 2002 now U.S. Pat. No. 6,703,723; and
3. application Ser. No. 10/727,981, filed Dec. 5, 2003 now U.S. Pat. No. 6,792,849, and each of which is incorporated herein by reference.

FIELD OF THE INVENTION

The present invention relates generally to household bean milk and bean curd makers, and more particularly, to a reinforcing device for household bean milk and bean curd makers, which reinforces a structure for fastening a drive motor to a main body using a bracket, thus reducing vibration and noise, and which is constructed such that a body cap extends to a predetermined length, thus preventing a lower portion of the main body from being thermally deformed, and thereby reducing vibration and noise.

DESCRIPTION OF THE RELATED ART

The process of making bean milk and bean curd using a traditional method is as follows.

First, beans are washed, and the washed beans are soaked in water for many hours. The soaked beans are grinded by a mill or a blender to obtain an extract of beans. The extract of beans is strained through a sieve or closely perforated cloth to be divided into bean curd dregs and an extract of protein.

Next, only the extract of protein is put into a vessel, such as a pot, and is boiled. At this time, the extract of protein may boil over. Thus, in order to prevent the extract of protein from boiling over, heating power must be carefully regulated by a user. After the extract of protein is boiled for a predetermined period, additives, including sugar, salt, and others, are added to the extract of protein into the bean milk.

Meanwhile, when it has been several minutes since a coagulant, such as calcium sulphate, was added to the extract of protein boiled for the predetermined period, and the extract of protein with the coagulant was stirred, watery bean curd is made. Further, when the watery bean curd is pressed in a frame to have a predetermined shape, the bean curd is made.

However, the conventional method of making bean milk and bean curd has a problem in that several processes are individually executed, thus it is inconvenient and complicated to make the bean milk and the bean curd, and it takes longer time to make the bean milk and the bean curd, and thereby the conventional method is inefficient.

In order to solve the problem, there have been proposed various devices for easily and conveniently making bean milk and bean curd at home. For example, there are Korean Patent No. 99-225772, Korean Patent No. 2000-228659, Korean U.M. Registration No. 158856, Korean U.M. Registration No. 250843, etc. The Korean Patent No. 99-225772 was published on Oct. 15, 1999, and is titled "household bean curd maker". The Korean Patent No. 2000-228659 was published on Mar. 15, 2000, and is titled "household bean curd maker". The Korean U.M. Registration No. 158856 was registered on Jul. 16, 1999, and is titled "household bean curd maker". The Korean U.M. Registration No. 250843 was registered on Oct. 5, 2001, and is titled "household bean curd maker with fixed-type blade unit".

A conventional household bean milk and bean curd maker will be described in the following with reference to FIG. 1.

FIG. 1 is a sectional view of the conventional household bean milk and bean curd maker. As shown in FIG. 1, the is conventional household bean milk and bean curd maker includes a housing 1 which has a cavity to contain water therein. A main body 2 is provided on an upper portion of the housing 1 to open or close the housing 1, like a lid. A drive motor 3 is installed in a predetermined portion of the main body 2, and generates rotating power when electricity is applied to the drive motor 3. A drive shaft 4 transmits the rotating power from the drive motor 3. A cutting blade 5 is provided at an end of the drive shaft 4. A heater 6 downwardly extends from the main body 2, and generates heat when electricity is applied to the heater 6, thus heating an interior of the housing 1. A temperature sensing bar 7 detects the temperature of the interior of the housing 1. A filter net 9 is detachably mounted to a predetermined portion of the main body 2, and contains beans therein. Further, the household bean milk and bean curd maker also includes a body cap 8 to protect a lower portion of the main body 2 and a part of the drive shaft 4.

The conventional household bean milk and bean curd maker which is constructed as described above is operated as follows.

First, a user puts water into the housing 1. The beans are put into the filter net 9 which is detached from the main body 2, and then the filter net 9 having the beans is assembled with the body cap 8 which is mounted to the lower portion of the main body 2. Thereafter, the main body 2 is placed on the upper portion of the housing 1 so that the filter net 9 is put into the housing 1.

Next, when a power switch (not shown) is turned on to apply electricity to the household bean milk and bean curd maker, a control unit (not shown) outputs a control signal to operate the heater 6 and the temperature sensing bar 7. At this time, a primary heating process is executed while maintaining a predetermined temperature, for a predetermined period.

When the primary heating process has been completed, the control unit outputs a control signal to operate the drive motor 3. As the drive motor 3 is operated, the beans contained in the filter net 9 are grinded by the cutting blade 5 provided at the end of the drive shaft 4. While the beans are grinded, the turbulence of water contained in the housing 1 is caused by a rotation of the cutting blade 5. By the turbulence, bean grains which are finely grinded by the cutting blade 5 come out of the filter net 9. Thus, the beans grinded by the cutting blade 5 are divided into bean-curd dregs which remain in the filter net 9, and the extract of protein which flows out the filter net 9.

Thereafter, the control unit outputs control signals to operate the heater 6 and the temperature sensing bar 7. At this time, a secondary heating process is executed while maintaining a predetermined temperature, for a predetermined period. Through the above-mentioned process, bean milk is obtained.

When the user desires to make bean curd, the user takes the heated extract of protein out of the housing 1. Next, the coagulant is added to the heated extract of protein so as to coagulate the extract of protein. Thereafter, the coagulated protein is pressed in the frame to produce the bean curd.

However, the conventional household bean milk and bean curd maker has a problem that a force to fasten the drive motor 3 to the main body 2 is relatively weak, thus causing vibration and noise. The conventional household bean milk and bean curd maker has another problem that the body cap 8 is short, thus a part of the lower portion of the main body 2 which is not covered with the body cap 8 may be thermally deformed, and thereby causing vibration and noise.

SUMMARY OF THE INVENTION

Accordingly, the present invention has been made keeping in mind the above problems occurring in the prior art, and an aspect of the present invention is to provide a reinforcing device for household bean milk and bean curd makers, which increases a force to fasten a drive motor to a main body using a bracket, thus reducing vibration and noise.

Another aspect of the present invention is to provide a reinforcing device for household bean milk and bean curd makers, which is constructed such that a body cap extends to a predetermined length, thus preventing a lower portion of the main body from being thermally deformed, and thereby reducing vibration and noise.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF THE PREFERRED EMBODIMENTS

Figure 1:
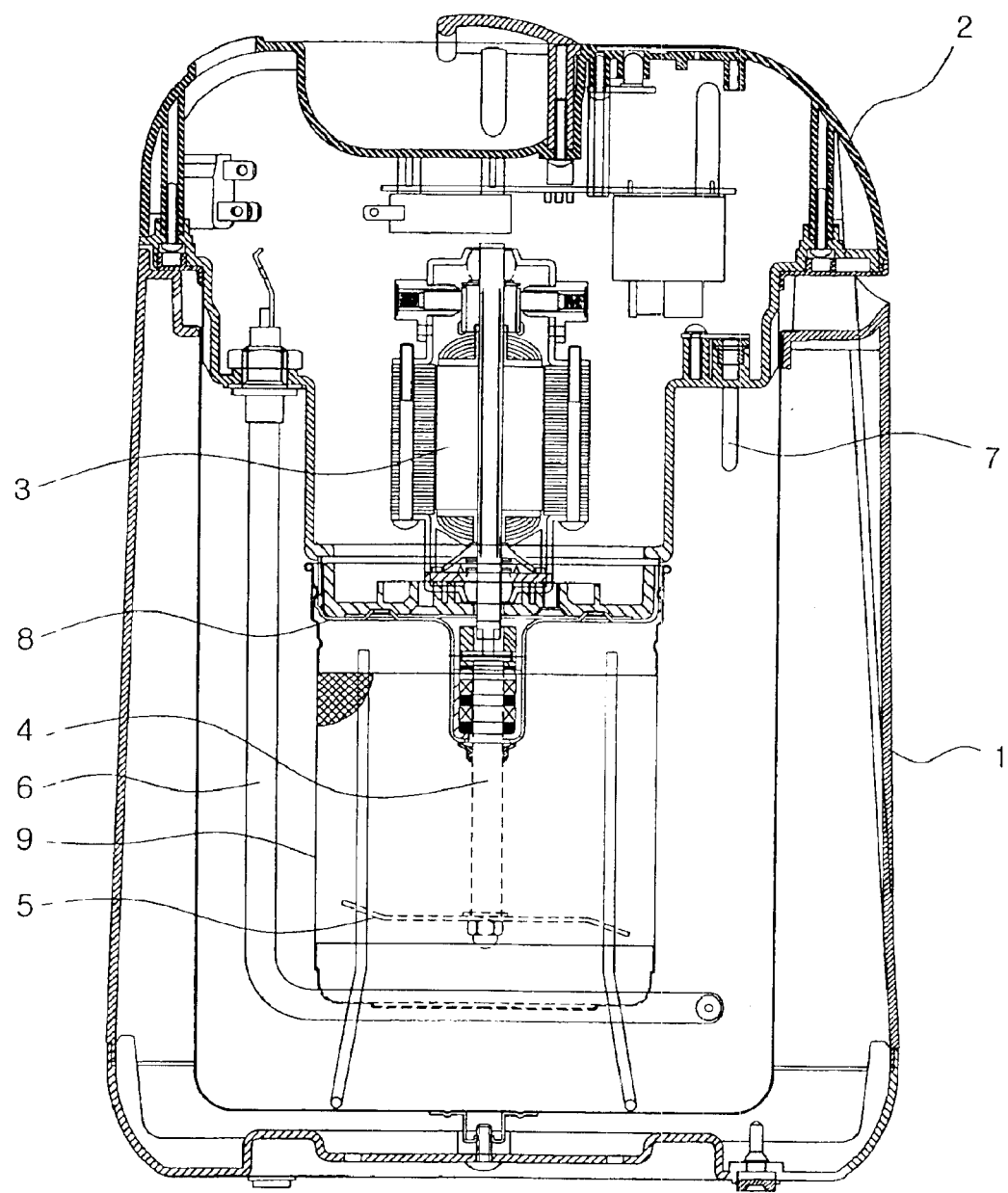
FIG. 1 is a sectional view of a conventional household bean milk and bean curd maker.

Hereinafter, embodiments of the present invention will be described in detail with reference to the attached drawings.

Reference now should be made to the drawings, in which the same reference numerals are used throughout the different drawings to designate the same or similar components.

Figure 2:
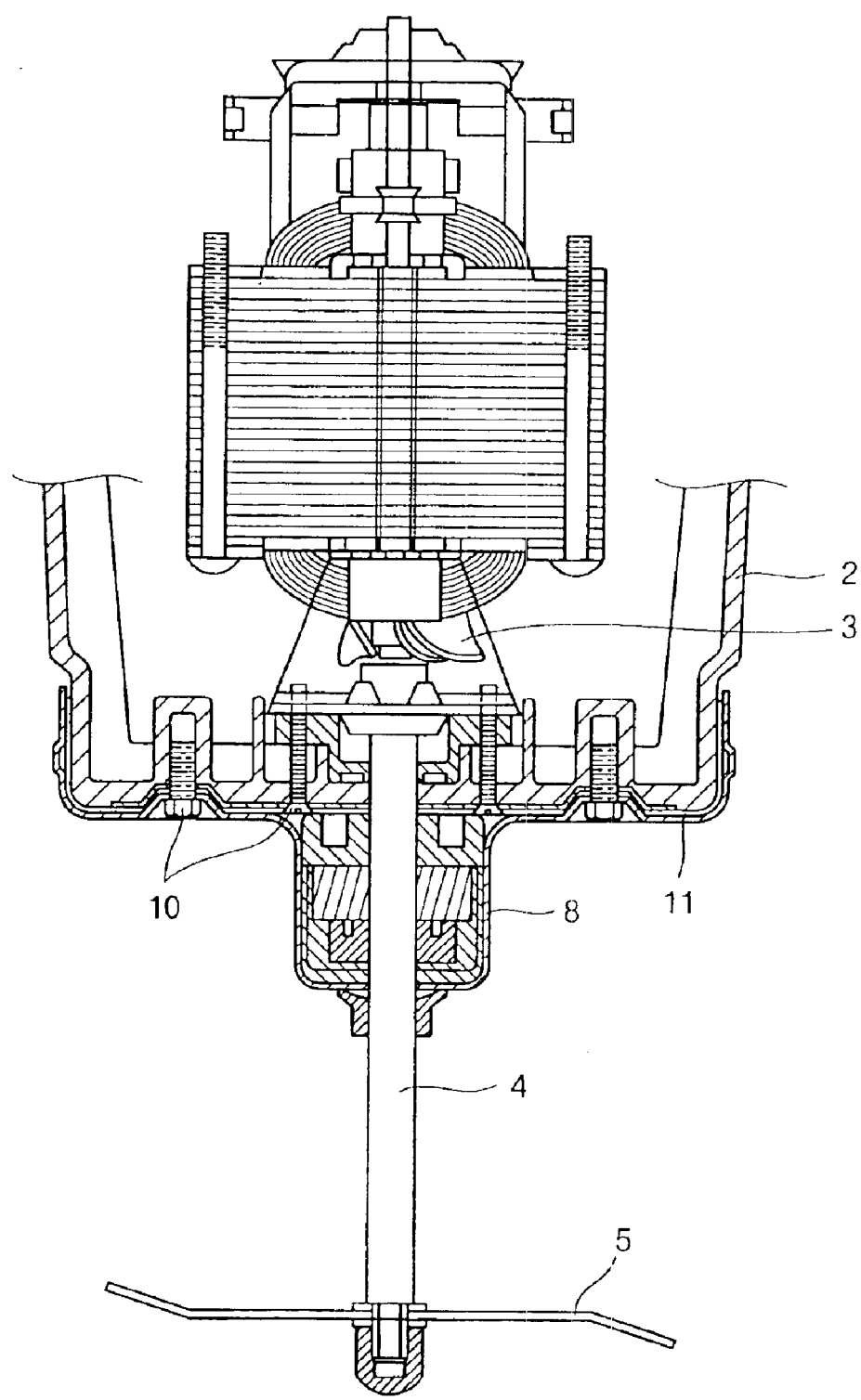
FIG. 2 is a sectional view of a reinforcing device of a household bean milk and bean curd maker, according to a first embodiment of the present invention.

FIG. 2 shows a reinforcing device of a household bean milk and bean curd maker, according to a first embodiment of the present invention. As shown in FIG. 2, the household bean milk and bean curd maker includes a housing (not shown), a main body 2, a drive motor 3, a drive shaft 4, a cutting blade 5, and a body cap 8. The housing has a cavity to contain water therein. The main body 2 is provided on an upper portion of the housing to open or close the housing, like a lid. The drive motor 3 is installed in a predetermined portion of the main body 2, and generates rotating power when electricity is applied to the drive motor 3. The drive shaft 4 transmits the rotating power from the drive motor 3. The cutting blade 5 is provided at an end of the drive shaft 4. The body cap 8 covers and protects both a lower portion of the main body 2 and a part of the drive shaft 4. In this case, the reinforcing device to reinforce a structure for fastening the drive motor 3 to the main body 2 includes a first bracket 11, and locking means 10. The first bracket 11 is provided at a predetermined position between the body cap 8 and the main body 2 to increase a force for fastening the drive motor 3 to the main body 2. The locking means 10 assemble the body cap 8, the first bracket 11, and the drive motor 3 with the main body 2 into a single structure.

According to the present invention, a bolt, a screw, a rivet, and others may be used as the locking means 10.

Figure 3:
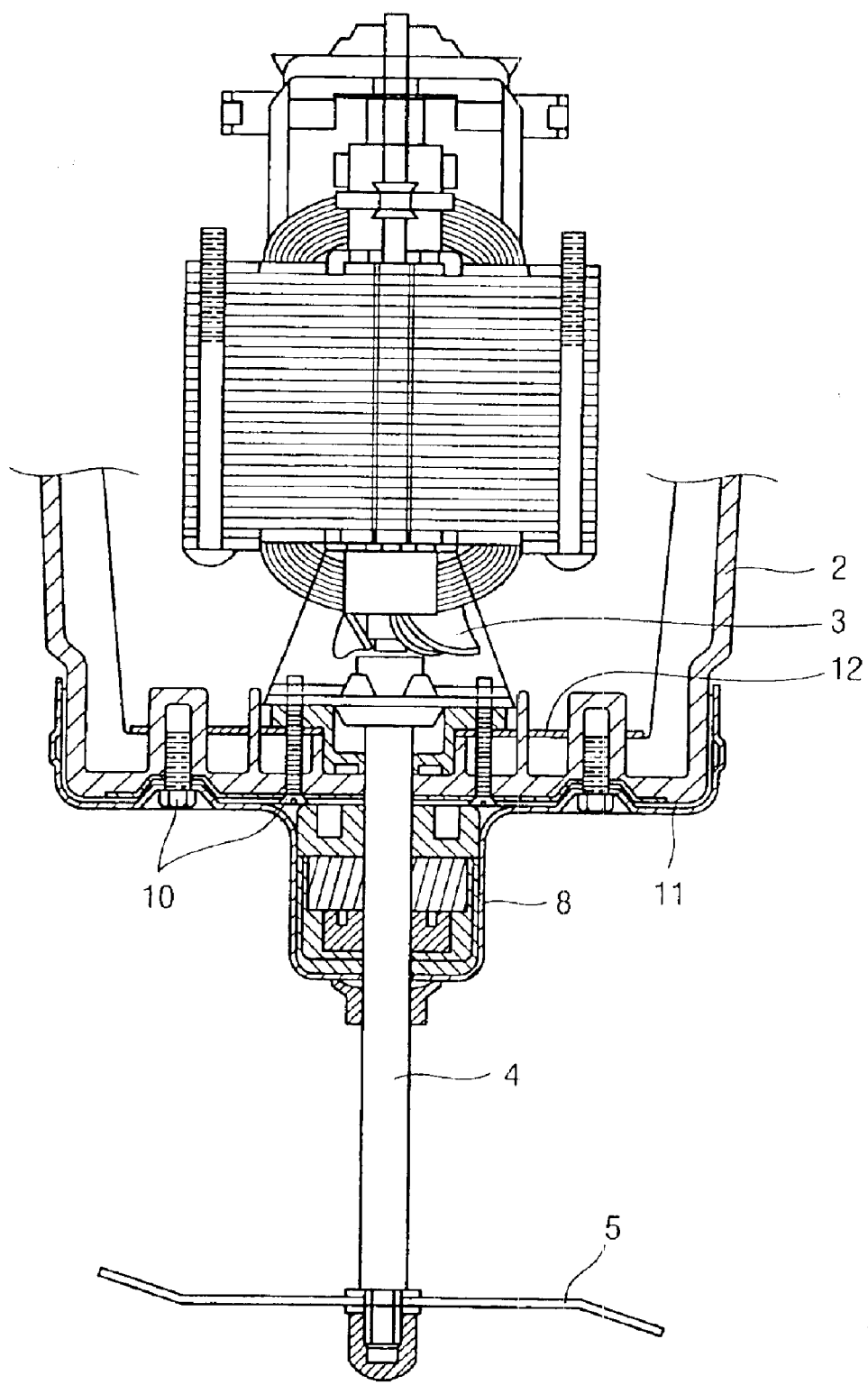
FIG. 3 is a sectional view of a reinforcing device of a household bean milk and bean curd maker, according to a second embodiment of the present invention.

FIG. 3 shows a reinforcing device of a household bean milk and bean curd maker, according to a second embodiment of the present invention. As shown in FIG. 3, the household bean milk and bean curd maker includes a housing (not shown), a main body 2, a drive motor 3, a drive shaft 4, a cutting blade 5, and a body cap 8. The housing has a cavity to contain water therein. The main body 2 is provided on an upper portion of the housing to open or close the housing, like a lid. The drive motor 3 is installed in a predetermined portion of the main body 2, and generates rotating power when electricity is applied to the drive motor 3. The drive shaft 4 transmits the rotating power from the drive motor 3. The cutting blade 5 is provided at an end of the drive shaft 4. The body cap 8 covers and protects both a lower portion of the main body 2 and a part of the drive shaft 4. According to the second embodiment of the present invention, the reinforcing device to reinforce a structure for fastening the drive motor 3 to the main body 2 includes a first bracket 11, a second bracket 12, and locking means 10. The first bracket 11 is provided at a predetermined position between the body cap 8 and the main body 2 to increase a force for fastening the drive motor 3 to the main body 2. The second bracket 12 is provided at a predetermined position between the main body 2 and the drive motor 3 to increase the force for fastening the drive motor 3 to the main body 2. The locking means 10 assemble the body cap 8, the first and second brackets 11 and 12, and the drive motor 3 with the main body 2 into a single structure.

The general construction of the reinforcing device of the household bean milk and bean curd maker according to the second embodiment remains the same as the reinforcing device of the first embodiment, except that the reinforcing device of the second embodiment further includes the second bracket 12 between the main body 2 and the drive motor 3 to increase the force for fastening the drive motor 3 to the main body 2.

Figure 4:
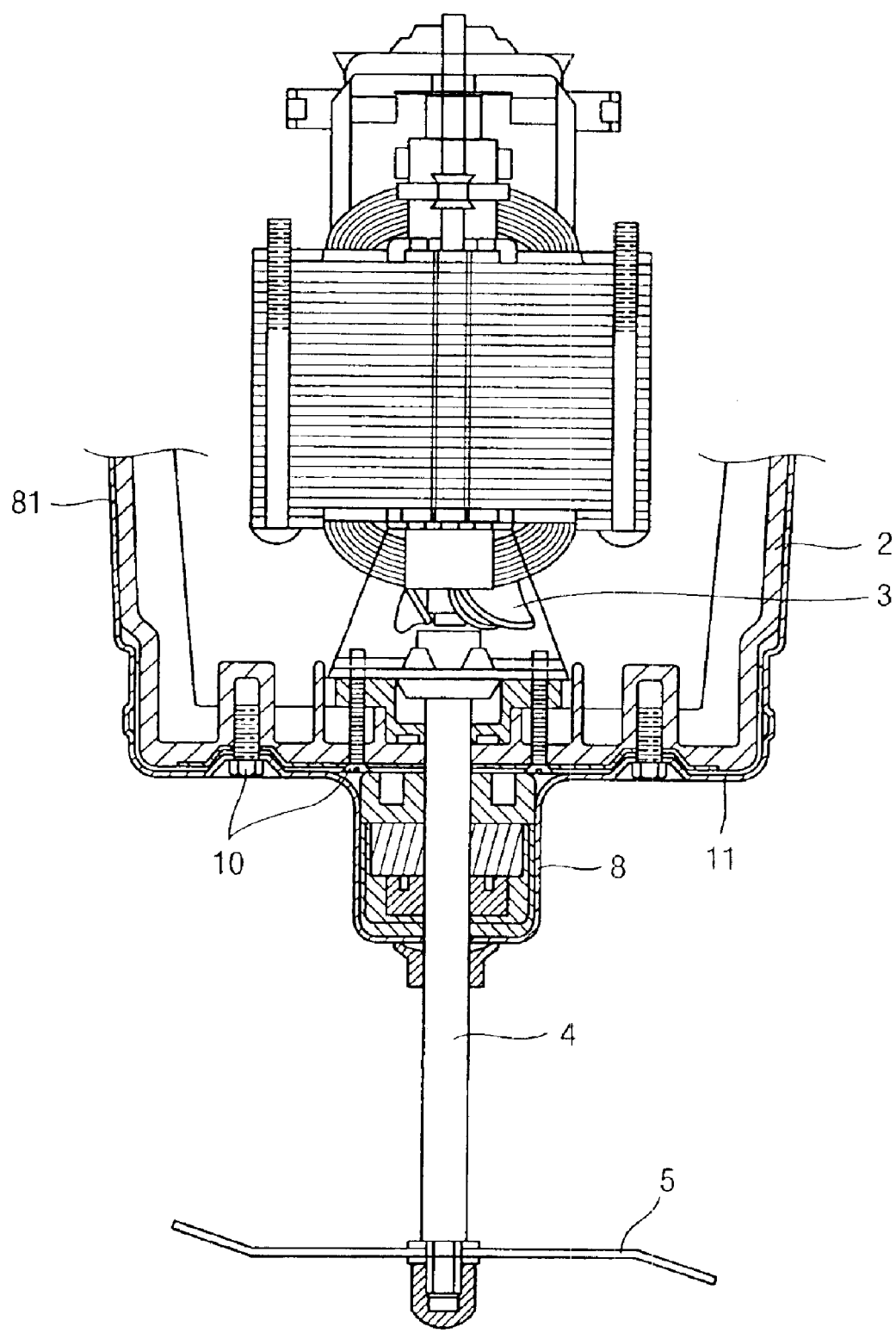
FIG. 4 is a sectional view of a reinforcing device of a household bean milk and bean curd maker, according to a third embodiment of the present invention.

FIG. 4 shows a reinforcing device of a household bean milk and bean curd maker, according to a third embodiment of the present invention. As shown in FIG. 4, the household bean milk and bean curd maker includes a housing (not shown), a main body 2, a drive motor 3, a drive shaft 4, a cutting blade 5, and a body cap 8. The housing has a cavity to contain water therein. The main body 2 is provided on an upper portion of the housing to open or close the housing, like a lid. The drive motor 3 is installed in a predetermined portion of the main body 2, and generates rotating power when electricity is applied to the drive motor 3. The drive shaft 4 transmits the rotating power from the drive motor 3. The cutting blade 5 is provided at an end of the drive shaft 4. The body cap 8 covers and protects both a lower portion of the main body 2 and a part of the drive shaft 4. According to the third embodiment, the reinforcing device to reinforce a structure for fastening the drive motor 3 to the main body 2 includes a first bracket 11 and locking means 10. The first bracket 11 is provided at a predetermined position between the body cap 8 and the main body 2 to increase a force for fastening the drive motor 3 to the main body 2. The locking means 10 assemble the body cap 8, the first bracket 11, and the drive motor 3 with the main body 2 into a single structure. According to the third embodiment, the body cap 8 extends to a predetermined length to form an extension part 81, thus preventing the lower portion of the main body 2 from being thermally deformed.

The general construction of the reinforcing device of the household bean milk and bean curd maker according to the third embodiment remains the same as the reinforcing device of the first embodiment shown in FIG. 2, except that the body cap 8 extends to the predetermined length to form the extension part 81.

Figure 5:
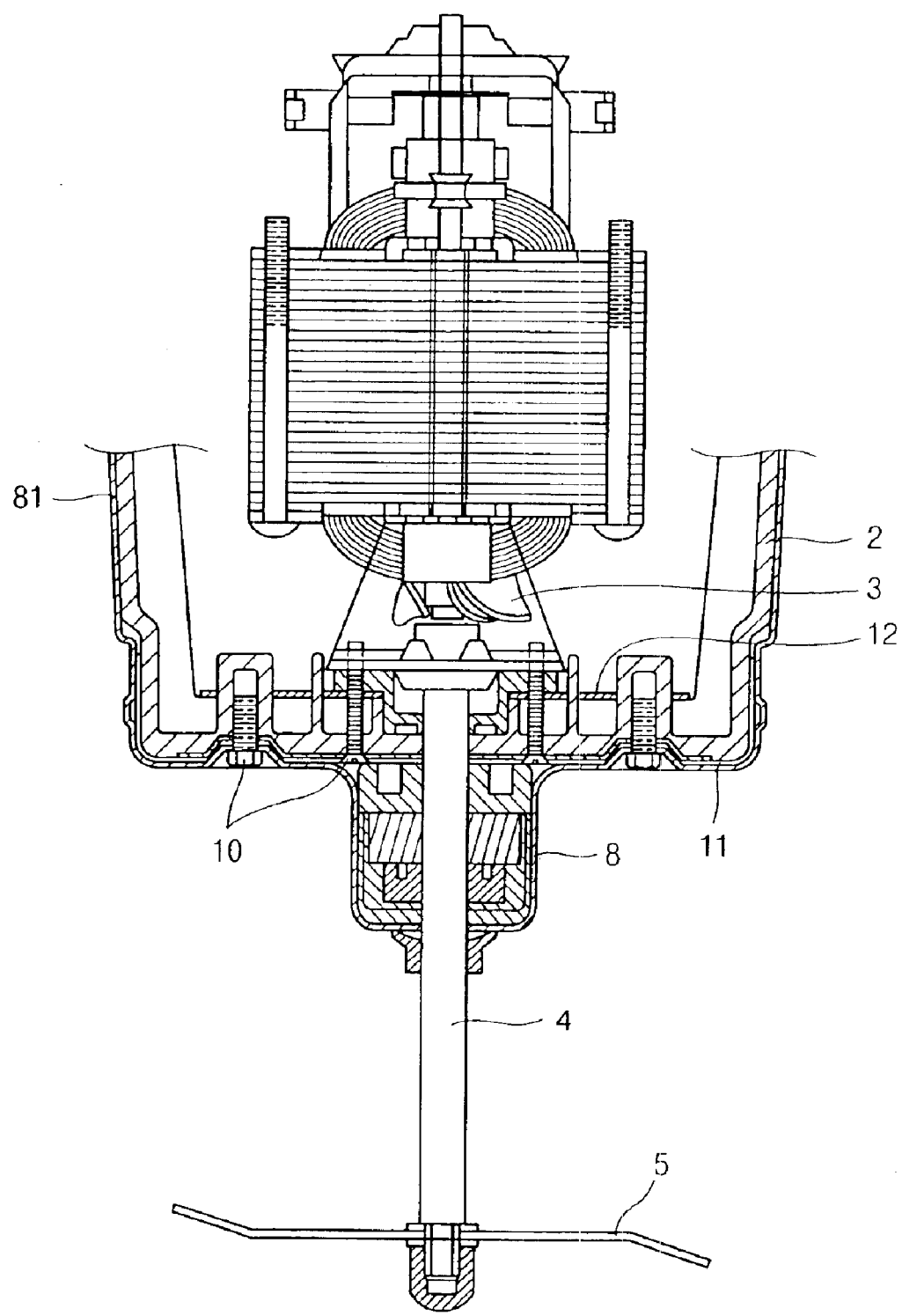
FIG. 5 is a sectional view of a reinforcing device of a household bean milk and bean curd maker, according to a fourth embodiment of the present invention.

FIG. 5 shows a reinforcing device of a household bean milk and bean curd maker, according to a fourth embodiment of the present invention. As shown in FIG. 5, the household bean milk and bean curd maker includes a housing (not shown), a main body 2, a drive motor 3, a drive shaft 4, a cutting blade 5, and a body cap 8. The housing has a cavity to contain water therein. The main body 2 is provided on an upper portion of the housing to open or close the housing, like a lid. The drive motor 3 is installed in a predetermined portion of the main body 2, and generates rotating power when electricity is applied to the drive motor 3. The drive shaft 4 transmits the rotating power from the drive motor 3. The cutting blade 5 is provided at an end of the drive shaft 4. The body cap 8 covers and protects both a lower portion of the main body 2 and a part of the drive shaft 4. According to the fourth embodiment of the present invention, the reinforcing device to reinforce a structure for fastening the drive motor 3 to the main body 2 includes a first bracket 11, a second bracket 12, and locking means 10. The first bracket 11 is provided at a predetermined position between the body cap 8 and the main body 2 to increase a force for fastening the drive motor 3 to the main body 2. The second bracket 12 is provided at a predetermined position between the main body 2 and the drive motor 3 to increase the force for fastening the drive motor 3 to the main body 2. The locking means 10 assemble the body cap 8, the first and second brackets 11 and 12, and the drive motor 3 with the main body 2 into a single structure. Further, according to the fourth embodiment, the body cap 8 extends to a predetermined length to form an extension part 81, thus preventing the lower portion of the main body 2 from being thermally deformed.

The general construction of the reinforcing device of the household bean milk and bean curd maker according to the fourth embodiment remains the same as the reinforcing device of the first embodiment shown in FIG. 2, except that the reinforcing device further includes the second bracket 12 between the main body 2 and the drive motor 3 to increase the force for fastening the drive motor 3 to the main body 2, and the body cap 8 extends to the predetermined length to form the extension part 81.

The operational effects of the reinforcing device for the household bean milk and bean curd makers according to the present invention are as follows.

When the body cap 8 and the drive motor 3 are assembled with the main body 2, the first bracket 11 is provided between the body cap 8 and the main body 2, and the second bracket 12 is provided between the main body 2 and the drive motor 3. Thereafter, the above-mentioned elements are assembled with each other by the locking means 10. At this time, the force for fastening the drive motor 3 to the main body 2 is increased.

Thus, vibration and noise are reduced during an operation of the drive motor 3.

Further, according to the present invention, the body cap 8 extends to the predetermined length to form the extension part 81, thus covering the lower portion of the main body 2. In this case, the body cap 8 having the extension part 81 is made of a metal, thus preventing the lower portion of the main body 2 made of plastics from being thermally deformed by a heater.

As such, the lower portion of the main body 2 is prevented from being thermally deformed, thus preventing substances toxic to people from being produced, and reducing the vibration and noise.

It will be appreciated that the term locking means is intended to include any locking element or locking device consist with the spirit of the invention. It will likewise be understood that the term "single structure" is meant to include a unitary or unified or integral structure, depending on the intended use.

As described above, the present invention provides a reinforcing device for household bean milk and bean curd makers, which reinforces a structure for fastening a drive motor to a main body using a bracket, thus reducing vibration and noise, and which is constructed such that a body cap extends to a predetermined length, thus preventing a lower portion of the main body from being thermally deformed, an reducing vibration and noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforcing device to reinforce a structure for fastening a drive motor to a main body in a household bean milk and bean curd maker including a housing having a cavity to contain water therein, the main body provided on an upper portion of the housing to open or close the housing, the drive motor installed in a predetermined portion of the main body and generating rotating power when electricity is applied to the drive motor, a drive shaft to transmit the rotating power from the drive motor, a cutting blade provided at an end of the drive shaft, and a body cap to cover and protect both a lower portion of the main body and a part of the drive shaft, the reinforcing device comprising:

a first bracket provided at a predetermined position between the body cap and the main body to increase a force to fasten the drive motor to the main body; and locking element for assembling the body cap, the first bracket, and the drive motor with the main body into a single body.

2. The reinforcing device according to claim 1, further comprising:

a second bracket provided at a predetermined position between the main body and the drive motor to increase the force to fasten the drive motor to the main body.

3. The reinforcing device according to claim 1, wherein the body cap extends to a predetermined length to form an extension part, thus preventing the lower portion of the main body from being thermally deformed.

4. The reinforcing device according to claim 2, wherein the body cap extends to a predetermined length to form an extension part, thus preventing the lower portion of the main body from being thermally deformed.

5. A household bean milk and bean curd maker, comprising:
  a) a housing having a cavity to contain water therein;
  b) a main body provided at an upper portion of the housing to open and close the housing;
  c) a drive motor provided in the main body, the drive motor generating rotating power when electricity is supplied to the drive motor;
  d) a drive shaft provided in the housing to transmit the rotating power from the drive motor;
  e) a cutting blade provided at an end of the drive shaft;
  f) a body cap provided adjacent the main body, the body cap being configured for covering and protecting both a lower portion of the main body and a part of the drive shaft;
  g) a reinforcing device provided on the main body, the reinforcing device including:
    i) a first bracket provided at a predetermined position between the body cap and the main body, the first bracket being configured for increasing a force to fasten the drive motor to the main body; and
    ii) a locking device provided for assembling the body cap, the first bracket, and the drive motor with the main body into a unitary body.

6. The household bean milk and bean curd maker according to claim 5, wherein:
  a) a second bracket is provided at a predetermined position between the main body and the drive motor, the second bracket being configured for increasing the force to fasten the drive motor to the main body.

7. The household bean milk and bean curd maker according to claim 6, wherein:
  a) the body cap extends to a predetermined length to define an extension part, the extension part being disposed and configured for preventing the lower portion of the main body from being thermally deformed.

8. The household bean milk and bean curd maker according to claim 5, wherein:
  a) the body cap extends to a predetermined length to define an extension part, the extension part being disposed and configured for preventing the lower portion of the main body from being thermally deformed.

* * * * *